United States Patent
Zheng et al.

(10) Patent No.: US 7,599,345 B2
(45) Date of Patent: Oct. 6, 2009

(54) METHOD, NETWORK ELEMENTS, A TERMINAL, A NETWORK INFRASTRUCTURE, AND A COMMUNICATION SYSTEM FOR TRIGGERING EVENTS

(75) Inventors: Haihong Zheng, Coppell, TX (US); Rene Purnadi, Coppell, TX (US); Srinivas Sreemanthula, Flower Mound, TX (US); Khiem Le, Coppell, TX (US); Mikko J. Rinne, Espoo (FI); Garl Eklund, Helsinki (FI)

(73) Assignee: Nokia Corporation, Espoo (FI)

( * ) Notice: Subject to any disclaimer, the term of this patent is extended or adjusted under 35 U.S.C. 154(b) by 888 days.

(21) Appl. No.: 11/008,971

(22) Filed: Dec. 13, 2004

(65) Prior Publication Data
US 2006/0126661 A1 Jun. 15, 2006

(51) Int. Cl.
*H04Q 7/00* (2006.01)
*H04Q 7/20* (2006.01)
*H04B 7/216* (2006.01)

(52) U.S. Cl. .................. 370/342; 370/328; 370/331; 370/335; 455/436; 709/249

(58) Field of Classification Search ............... 370/328, 370/329, 326, 469, 230.1, 230–238, 331–428, 370/465–467; 455/436–440, 435.1; 709/218, 709/227, 249
See application file for complete search history.

(56) References Cited

U.S. PATENT DOCUMENTS

| | | | |
|---|---|---|---|
| 5,805,078 A | * | 9/1998 | Sugiyama et al. ........ 340/825.52 |
| 2002/0085517 A1 | * | 7/2002 | Lee et al. ................... 370/331 |
| 2002/0118656 A1 | | 8/2002 | Agrawal et al. |
| 2003/0225887 A1 | | 12/2003 | Purnadi et al. |

OTHER PUBLICATIONS

Greg Daley et al.; "Movement Detection Optimization in Mobile IPv6"; IETF Standard-Working-Draft; Internet Engineering Task Force, IETF, CH, May 01, 2003, pp. 1-24.

Daniel Park et al. "L2 Triggers Optimized Mobile IPv6 Vertical Handover: The 802.11/GPRS Example"; IETF Standard-Working Draft, Internet Engineering Task force, IETF, CH; Jan. 31, 2004; pp. 19.

(Continued)

*Primary Examiner*—Afsar M. Qureshi
(74) *Attorney, Agent, or Firm*—Mintz, Levin, Cohn, Ferris, Glovsky and Popeo, P.C.

(57) ABSTRACT

A method, network elements, a terminal, and a system of triggering events in a protocol layer stack of a communication system comprising at least one terminal and a network infrastructure including at least a first network element and a second network element, the method comprising the steps of detecting a terminal-related event of a lower protocol layer at the first network element; initiating a network-related event of a higher protocol layer to be rendered effective at the terminal, wherein the step of initiating further comprises a step of determining a necessity for the higher layer event on the basis of the detected lower layer event, and the step of initiating is effected in case the step of determining yields a necessity for the higher layer event to be triggered.

39 Claims, 7 Drawing Sheets

OTHER PUBLICATIONS

JinHyeock Choi et al.; "Fast Router Discovery With RA Caching in AP"; IETF Standard-Working Draft, Internet Engineering Task force, IETF, CH; Feb. 2003; pp. 1-5.

K. El Maki; "Low Latency Handoffs in Mobile IPv4"; IETF Standard-Working Draft, Internet Engineering Task force, IETF, CH; Jun. 09, 2004; pp. 1-54.

R. Hinden et al. "IP Version 6 Addressing Architecture"; Network Working Group, Standards Track; Dec. 1995; pp. 1-18.

Alper E. Yegin et al.; "Supporting Optimized Handover for Ip Mobility - Requirements for Underlying Systems"; Informational Internet Draft; Jun. 2002; pp. 1-11.

Alper Yegin et al.; "Link-Layer Triggers and Hints for Detecting Network Attachments"; Internet Draft; Feb. 2004; pp. 1-23.

Official communication issued in the corresponding PCT international application no. PCT/IB2005/002228 mailed on Nov. 24, 2005.

* cited by examiner

METHOD, NETWORK ELEMENTS, A TERMINAL, A NETWORK INFRASTRUCTURE, AND A COMMUNICATION SYSTEM FOR TRIGGERING EVENTS

FIELD OF THE INVENTION

The present invention relates to a method, network elements, a terminal, a network infrastructure, and a communication system for triggering events in a protocol layer stack of a communication system. In particular, the present invention relates to an interworking of link layer procedures and network layer procedures in a communication network environment.

BACKGROUND OF THE INVENTION

In recent years, communication technology has widely spread in terms of number of users and amount of use of the telecommunication services by the users. This also led to an increase in the number of different technologies and technological concepts in use.

Thereby, developments have been especially remarkable in mobile communication networks. In this connection, one trend is an increasing usage of communication protocols for wireless communications, that have originally been designed and hitherto been used for fixed networks. The most popular and widely spread example is the Internet Protocol (IP) suite. The IP protocol will for example be utilized in Third Generation (3G) mobile communication networks such as the Universal Mobile Telecommunication System UMTS.

However, when using such fixed network protocols and/or technologies for mobile communications, there may occur a plurality of problems because of these protocols and/or technologies not being specifically designed for the conditions and needs of mobile communications.

In the following, there is explained an example situation for illustrating such a non-conformance.

In an IP-based (fixed) network, hosts, i.e. communication entities such as terminals, listen to IP level (network layer) control messages in order to obtain network configuration information and/or perform self-configuration for IP addressing based on system information. These IP level (network layer) control messages can be unicast to a single host or can be multicast or broadcast to multiple or all (in case of broadcast) hosts within the network. One typical example of such IP level control messages is an IPv6 Router Advertisement, wherein IPv6 stands for version 6 of the Internet Protocol.

Nevertheless, the applicability of the present invention to be described below is not limited to IPv6. Also, IPv4 or any other version of IP or even any other packet-based protocol type—whether presently known or being developed in the future—may be used in connection with the present invention.

Routers in the network advertise their presence or existence together with various link and router parameters. Router Advertisements (RAs) contain prefixes that are used for on-link determination and/or address configuration, a suggested hop limit value, etc. Further, Router Advertisements (and prefix flags) allow routers to inform hosts how to perform address auto-configuration. For example, some routers specify whether hosts should use stateful (e.g. Dynamic Host Configuration Protocol version 6; DHCPv6) and/or autonomous (stateless) address configuration.

Routers usually send such Router Advertisements in two ways, i.e. either periodically multicast unsoliciated RAs, or unicast RAs to the soliciting host in response to a soliciting message such as a Router Solicitation message.

Therefore, the triggering for a router to send the Router Advertisement is either an expiration of a respective RA timer (for multicast RAs) or a reception of a Router Solicitation message (for unicast RAs). Both of these events are events of the IP or network layer according to the ISO/OSI (International Standards Organization/Open System Interconnection) specification.

The existing prior art (network or IP layer) approaches as described above are originally designed and have been experienced to be well suitable for fixed networks. However, they are hardly applicable to a system like a wireless network where seamless mobility is vital, handovers occur very often, and maintaining a high spectrum efficiency is also essential. The issues and problems in this regard are listed in the sequel.

In a wireless network, when a terminal such as a mobile node MN or a mobile station MS attaches to a new system (i.e. when MN is powered up or performs a handover to an area covered by a different access router), it first sets up a link level (L2) connection and obtains a link level identity. Then, the MN needs to obtain a Router Advertisement on the basis of which its IP address can be configured. As mentioned above, the Router Advertisement is a network layer (L3) event. Therefore, according to the ISO/OSI specification, normally a logical link layer connection has to be set up before communication and/or signaling on the network layer is possible. Thereafter, if the periodic (multicast) Router Advertisement RA is sent shortly before (in relation to the timer period), the terminal may need to wait until the next periodic Router Advertisement RA is sent. Alternatively, the terminal may choose to send a request message such as a Router Solicitation message to explicitly request for a Router Advertisement. After receiving the Router Solicitation message, the respective access router AR may nevertheless decide to delay the response in case the next periodic RA is already scheduled to occur within short. This basically indicates that the mobile terminal may experience a rather long and possibly unacceptable (in particular, for certain realtime services) delay before it can request and/or configure its IP address after attaching to a wireless system.

Even if the regular prior art procedure described above may be applicable to the terminal power-up procedure where a longer delay is still tolerable (e.g. for non-realtime services), it is not applicable to handover procedures where a seamless communication has to be ensured. Moreover, it is still beneficial if such a delay can be minimized to the lowest value even in situations being tolerable to longer delays. In addition, reducing such delay during an inter-AR handover, i.e. during a handover where a terminal hands over to another access router, will reduce the overhead due to tunneling between the old access router and the new access router for the terminal performing the handover.

In the above procedure, the IP level control message such as the Router Advertisement is triggered by an event in the IP level. For example, the Router Advertisement is sent either upon expiry of the respective RA timer or upon reception of a request such as a Router Solicitation message.

However, the presented procedures have several disadvantages in terms of excessively long delays until network layer configuration is established, low spectrum efficiency due to excessive network layer signaling, and inflexibility. For example, with the known solutions, whenever a new terminal attaches to the network (i.e. to the base transceiver station), a Router Advertisement is to be sent, even if this is not necessary.

Therefore, improving network layer, and in particular IP layer handover and power up performance has been identified as an important objective for further development. For this purpose, a solution to the above problems and drawbacks is needed.

SUMMARY OF THE INVENTION

Consequently, it is an object of the present invention to remove the above drawbacks inherent to the prior art and to provide an accordingly improved method, base station, network element, and system.

According to a first aspect of the invention, this object is for example achieved by a method of triggering events in a protocol layer stack of a communication system comprising at least one terminal and a network infrastructure including at least a first network element and a second network element, the method comprising the steps of: detecting a terminal-related event of a lower protocol layer, a lower layer event, at the first network element; initiating a network-related event of a higher protocol layer, a higher layer event, to be rendered effective at the terminal, wherein the step of initiating further comprises a step of determining a necessity for the higher layer event on a basis of the detected lower layer event, and the step of initiating is effected in case the step of determining yields a necessity for the higher layer event to be triggered.

According to further advantageous developments one or more of the following applies:

the step of determining is effected at the first network element;

the step of initiating the higher layer event is effected at the first network element on behalf of the second network element;

the method further comprises the steps of: sending current information on the higher layer event from the second network element to the first network element; and storing the sent information at the first network element, wherein the steps of sending and storing are effected prior to the step of detecting the lower layer event, and the step of initiating the higher layer event is based on the stored information;

the step of initiating the higher layer event is effected at the second network element;

the method further comprises a step of sending a request for the higher layer event from the first network element to the second network element in case the step of determining yields the necessity for the higher layer event to be triggered, the request being based on the detected lower layer event;

the steps of determining and initiating the higher layer event are effected at the second network element;

the method further comprises a step of sending a request for the higher layer event from the first network element to the second network element, the request being based on the detected lower layer event;

the request comprises at least one of an interface identity parameter of the terminal and a link local address parameter of the terminal;

the step of determining further comprises a step of designating whether the higher layer event is to be triggered for one terminal or for a plurality of terminals at a time;

the protocol layer stack comprises a protocol stack of a packet-based transmission protocol and the method is performed in the protocol stack of the packet-based transmission protocol;

1the lower protocol layer comprises a data link layer and the step of detecting the terminal-related event comprises detecting the terminal-related event of the data link layer;

the higher protocol layer comprises a network layer and the step of detecting the network-related event comprises detecting the network-related event of the network layer;

the lower layer event comprises a link association request message and the step of detecting the terminal-related event comprises detecting the link association request message;

the link association request message comprises at least one of an interface identity parameter of the terminal, a link local address of the terminal, a current IP address parameter of the terminal and network identity parameter of the terminal and a routing area identity parameter of the terminal and a router solicitation flag parameter of the terminal; and the higher layer event comprises a router advertisement message and the step of initiating the network-related event comprises initiating the router advertisement message.

According to a second aspect of the invention, this object is for example achieved by a network element of a network infrastructure which is configured for triggering events in a protocol layer stack of a communication system comprising at least one terminal and the network infrastructure additionally including at least a second network element, the network element comprising: detecting means for detecting a terminal-related event of a lower protocol layer, a lower layer event; determining means for determining a necessity for a network-related event of a higher protocol layer, a higher layer event, on the basis of the detected lower layer event; initiating means for initiating, on behalf of the second network element, the higher layer event to be rendered effective at the terminal, if the determining means yields a necessity for the higher layer event to be triggered; receiving means for receiving current information on the higher layer event from the second network element; and storing means for storing the received information, wherein the initiating means is configured to initiate the higher layer event based on the stored information.

According to a third aspect of the invention, this object is for example achieved by a network element of a network infrastructure which is configured for triggering events in a protocol layer stack of a communication system comprising at least one terminal and the network infrastructure further including at least a second network element, the network element comprising: detecting means for detecting a terminal-related event of a lower protocol layer, a lower layer event; determining means for determining a necessity for a network-related event of a higher protocol layer, a higher layer event, on the basis of the detected lower layer event; requesting means for sending a request for the higher layer event to the second network element, if the determining means yields a necessity for the higher layer event to be triggered, the request being based on the detected lower layer event; and relaying means for relaying the higher layer event being initiated at the second network element to the terminal.

According to a fourth aspect of the invention, this object is for example achieved by a network element of a network infrastructure which is configured for triggering events in a protocol layer stack of a communication system comprising at least one terminal and the network infrastructure further including at least a second network element, the network element comprising: detecting means for detecting a terminal-related event of a lower protocol layer, a lower layer event; requesting means for sending a request for a higher layer event to the second network element, the request being based on the detected lower layer event; and relaying means for relaying the higher layer event being initiated at the second network element to the terminal.

According to further advantageous developments one or more of the following applies:
the network element according to the second, third, or fourth aspect further comprises designating means for designating whether the higher layer event is to be triggered for one terminal or for a plurality of terminals at a time; and
the network element according to the second, third, or fourth aspect comprises a base transceiver station.

According to a fifth aspect of the invention, this object is for example achieved by a network element of a network infrastructure which is configured for triggering events in a protocol layer stack of a communication system comprising at least one terminal and the network infrastructure further including at least a first network element, the network element comprising: informing means for sending current information on a network-related event of a higher protocol layer, a higher layer event, to the first network element prior to the first network element detecting a terminal-related event of a lower protocol layer, a lower layer event.

According to a sixth aspect of the invention, this object is for example achieved by a network element of a network infrastructure which is configured for triggering events in a protocol layer stack of a communication system comprising at least one terminal and the network infrastructure further including at least a first network element, the network element comprising: receiving means for receiving a request for a network-related event of a higher protocol layer, a higher layer event, from the first network element, the request being based on a detected terminal-related event of a lower protocol layer, a lower layer event; and initiating means for initiating, based on the received request, the higher layer event to be rendered effective at the terminal.

According to a seventh aspect of the invention, this object is for example achieved by a network element of a network infrastructure which is configured for triggering events in a protocol layer stack of a communication system comprising at least one terminal and the network infrastructure further including at least a first network element, the network element comprising: receiving means for receiving a request for a network-related event of a higher protocol layer, a higher layer event, from the first network element, the request being based on a detected terminal-related event of a lower protocol layer, a lower layer event; determining means for determining a necessity for the higher layer event on the basis of the detected lower layer event; and initiating means for initiating, based on the received request, the higher layer event to be rendered effective at the terminal, if the determining means yields a necessity for the higher layer event to be triggered.

According to further advantageous developments one or more of the following applies:
the network element according to the sixth or seventh aspect further comprises designating means for designating whether the higher layer event is to be triggered for one terminal or for a plurality of terminals at a time; and
the network element according to the fifth, sixth, or seventh aspect comprises an access router.

According to an eighth aspect of the invention, this object is for example achieved by a network infrastructure which is configured for triggering events in a protocol layer stack of a communication system comprising at least one terminal and the network infrastructure including: at least one first network element according to the second aspect and at least one second network element according the fifth aspect.

According to a ninth aspect of the invention, this object is for example achieved by a network infrastructure which is configured for triggering events in a protocol layer stack of a communication system comprising at least one terminal and the network infrastructure including: at least one first network element according to the third aspect and at least one second network element according to the sixth aspect.

According to a tenth aspect of the invention, this object is for example achieved by a network infrastructure which is configured for triggering events in a protocol layer stack of a communication system comprising at least one terminal and the network infrastructure including: at least one first network element according to the fourth aspect and at least one second network element according to the seventh aspect.

According to an eleventh aspect of the invention, this object is for example achieved by a terminal of a communication system which is configured for triggering events in a protocol layer stack of the communication system comprising the terminal and a network infrastructure including at least a first network element and a second network element, the terminal comprising: initiating means for initiating a terminal-related event of a lower protocol layer, a lower layer event, at the first network element, and effecting means for rendering effective a network-related event of a higher protocol layer, a higher layer event, being initiated at the network infrastructure.

According to further advantageous developments one or more of the following applies:
the lower layer event is a sending of a link association request message to the first network element;
the link association request message comprises at least one of an interface identity parameter of the terminal, a link local address of the terminal, a current IP address parameter of the terminal and network identity parameter of the terminal and a routing area identity parameter of the terminal and a router solicitation flag parameter of the terminal; and
the higher layer event is a receipt of a router advertisement message from the network infrastructure.

According to a twelfth aspect of the invention, this object is for example achieved by a communication system comprising a network infrastructure according to the eight aspect of the present invention; and a terminal according to the eleventh aspect of the present invention.

According to a thirteenth aspect of the invention, this object is for example achieved by a communication system comprising a network infrastructure according to the ninth aspect of the present invention; and a terminal according to the eleventh aspect of the present invention.

According to a fourteenth aspect of the invention, this object is for example achieved by a communication system comprising a network infrastructure according to the tenth aspect of the present invention; and a terminal according to the eleventh aspect of the present invention.

It is an advantage of the present invention that existing lower layer procedures, e.g. link layer procedures, are used to trigger higher layer procedures, e.g. IP layer procedures.

Thus, it is a further advantage of the embodiments of the present invention that lower layer procedures and higher layer procedures do interwork with each other in an efficient manner.

With the embodiments of the present invention, with higher layer procedures and lower layer procedures interworking with each other, delays caused by separate procedures are reduced and system performance is improved.

With the embodiments of the present invention, no excessive higher layer signaling is needed.

It is another advantage of the present invention that spectrum efficiency is improved.

Further, it is advantageous that the advantageous aspects of the present invention are achieved without basically increasing the complexity of the network elements involved.

BRIEF DESCRIPTION OF THE DRAWINGS

In the following, the present invention will be described in greater detail with reference to the accompanying drawings, in which.

DETAILED DESCRIPTION OF EMBODIMENTS OF THE INVENTION

From the following description of the embodiments and implementation examples of the present invention, further aspects, features and advantages of the present invention will be more apparent. It is to be noted that the following description is only intended to illustrate the present invention by means of various embodiments and examples. For a person skilled in the art, it is obvious that the present invention is also applicable to other situations, networks and devices as long as their functions are similar to the ones presented hereinafter.

For the remainder of the description, an exemplary situation is presumed where a mobile terminal either powers up or performs a handover, and is connected to a base transceiver station BTS of a mobile communication network. The base transceiver station represents an access point of a mobile terminal to the network, and it is mainly in charge of establishing a connection with mobile terminals on lower layers of the ISO/OSI model, in particular of performing link layer procedures. The mobile communication network also comprises a router being denoted by access router AR below. The access router represents an access point to an IP-based part of the network, and it is in charge of higher layer procedures to be performed.

In view of the presented embodiments, the description relates to how a link layer event triggers the network to send an IP layer control message, although the present invention is restricted neither to procedures on these specific layers nor to the specific events and/or messages used.

Figure 1:
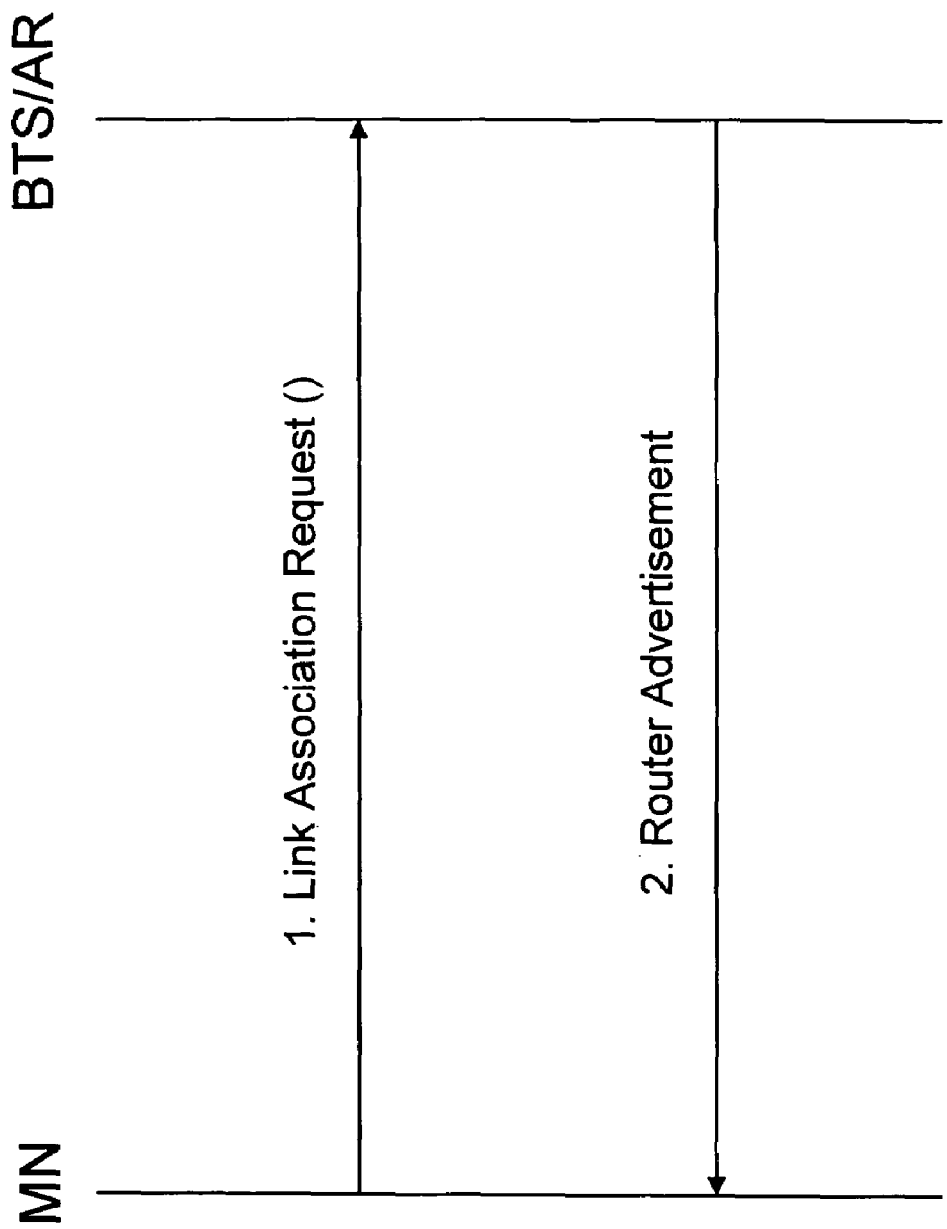
FIG. 1 depicts a basic signaling flow chart according to the present invention.

FIG. 1 depicts a signaling flow chart according to the present invention, which illustrates the basic concept of the present invention in a simple manner.

In principle, a mobile node MN sends a link layer message. In FIG. 1, this is represented by a Link Association Request message. The reception of this Link Association Request message or an equivalent link establishment message from mobile node MN triggers the network, which is represented by a combination of a base transceiver station BTS and an access router AR, to excite a network layer event. In this case, the network layer event is a sending of a Router Advertisement message to the mobile node MN.

However, a Router Advertisement RA message does not always have to be sent when receiving a Link Association Request message. Therefore, once the network infrastructure BTS/AR receives the link establishment message, it is desirable to be determined if a RA message needs to be sent. For this purpose, the network infrastructure according to the present invention is provided with intelligence. Such approaches are illustrated in the following embodiments.

Stated in other words, there is provided a method of triggering events in a protocol layer stack of a communication system comprising at least one terminal and a network infrastructure including at least a first network element and a second network element, the method comprising the steps of detecting a terminal-related event of a lower protocol layer at the first network element; initiating a network-related event of a higher protocol layer to be rendered effective at the terminal, wherein the step of initiating further comprises a step of determining a necessity for a higher layer event on the basis of the detected lower layer event, and the step of initiating is effected in case the step of determining yields a necessity for the higher layer event to be triggered.

First Embodiment

Figure 2:
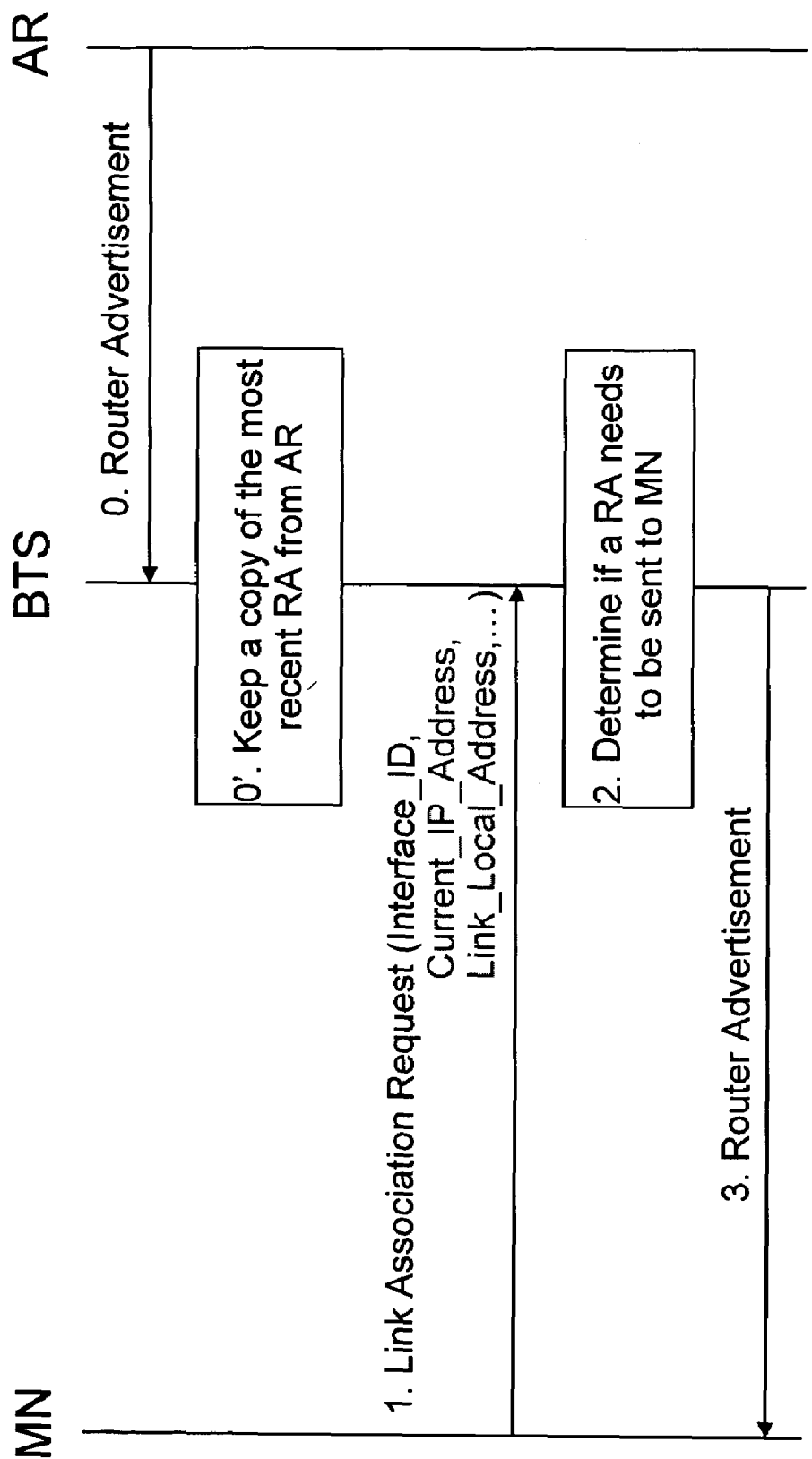
FIG. 2 depicts a signaling flow chart according to a first embodiment of the present invention.

FIG. 2 depicts a signaling flow chart according to a first embodiment of the present invention. In this figure, the network infrastructure consisting of a base transceiver station BTS and an access router AR is illustrated to be split up. However, it is to be noted that both network elements can also be implemented at the same place and/or in a conjoint infrastructural node.

The basic idea of the present embodiment is that the base transceiver station representing a first network element determines if a higher layer message needs to be sent based on the presence or the value of one or more parameters carried in a lower layer message. If required, the base transceiver station sends the higher layer message, or in general initiates the higher layer event, on behalf of the access router representing a second network element.

In step 0 of FIG. 2, the access router AR sends a Router Advertisement message to the base transceiver station. The base transceiver station stores a copy of this message and/or the relevant information in this regard (step 0'). When a new Router Advertisement is sent by the access router upon expiry of a respective RA timer, the new information replaces the old one. Therewith, by steps 0/0', the BTS always keeps a copy of the most recent higher layer event or message multicasted from the access router.

In practice, this is effected in that the base transceiver station registers itself in the "all-node" multicast address which is used by the access router for multicasting. Such multicasting from the access router to the nodes of the multicast group can be performed periodically or whenever needed. Therefore, as a member of the multicast group, the base transceiver station always receives Router Advertisements, and therefore is able to keep the most up-to-date RA information.

When a mobile node MN, for example, attaches to the base transceiver station BTS (e.g., powering up or handing over from another BTS), it first sends a link establishment message on the link layer to the base transceiver station, such as a Link Association Request. Some example parameters to be included in the Link Association Request message are listed below.

MN's Interface_ID: It is either statically configured or dynamically assigned.

Link_Local_Address of the mobile node: The link local address is configured using the standard IPv6 (Internet Protocol version 6) format as defined in section 2.4.8 in RFC 1884. If the base transceiver station BTS can generate the link local address of the mobile node based on the interface ID of the mobile node, then this parameter is not needed.

Some more example parameters are listed in the following, which can be used by the base transceiver station to determine if a network layer message is to be sent or a network layer event is to be excited to the mobile node right away.

Current_IP_Address of the mobile node: In the case of powering up, the absence of the Current_IP_Address may indicate that a new IP address is required. In the case of a handover, the base transceiver station BTS can determine if a new IP address needs to be assigned based on the pre-fix of the Current_IP_Address.

Network_Id: This parameter carries an identity code of the network, from which the mobile node just hands over. If the Network_Id parameter is different from the network identity code served by the current base transceiver station, then a Router Advertisement RA needs to be sent as a higher layer message right away as described below.

Routing_Area_Id: This parameter carries an identity code of the routing area, from which the mobile node just hands over. If the Routing_Area_Id parameter is different from the routing area identity code served by the current base transceiver station, then a Router Advertisement RA needs to be sent as a higher layer message right away as described below.

Router_Solicitation_Flag: The mobile node MN uses this parameter to explicitly request the network to send a Router Advertisement RA.

It is to be noted that these parameters do not need to be included at the same time.

Upon receiving the Link Association Request Message with respective parameters, the base transceiver station BTS first determines in step 2 if a new IP address needs to be assigned to the mobile node MN right away (e.g., when the mobile node powers up or hands over from another access router AR) and, thus, if a Router Advertisement RA needs to be sent right away. The decision can be based on the network prefix of the Current_IP_Address parameter, the Network_Id parameter, the Routing_Area_Id parameter, the Router_-Solicitation_Flag or other approaches.

If the Router Advertisement RA needs to be sent to the mobile node MN right away, the base transceiver station BTS unicasts the respective RA message it restored in steps 0/0' to the link local address of the mobile node MN (step 3). The link local address is obtained from the parameter Link_Local_Address or generated based on the parameter Interface_ID (according to RFC 1884).

If multiple Link Association Request messages are generated from multiple mobile nodes and sent to the same base transceiver station, which indicates that multiple mobile nodes require a network layer event or message, the base transceiver station BTS multicasts the Router Advertisement message. Therewith, spectrum efficiency is improved and processing overhead is reduced as compared to unicasting the message to every single mobile node.

Stated in other words, in the method according to this embodiment, the steps of determining and initiating the higher layer event are both effected at the first network element, i.e. the base transceiver station. The method further comprises the steps of sending current information on a higher layer event from the second network element to the first network element, and storing the sent information at the first network element. The steps of sending and storing are effected prior to the step of detecting the lower layer event, and the step of initiating the higher layer event is based on the stored information.

Figure 3:
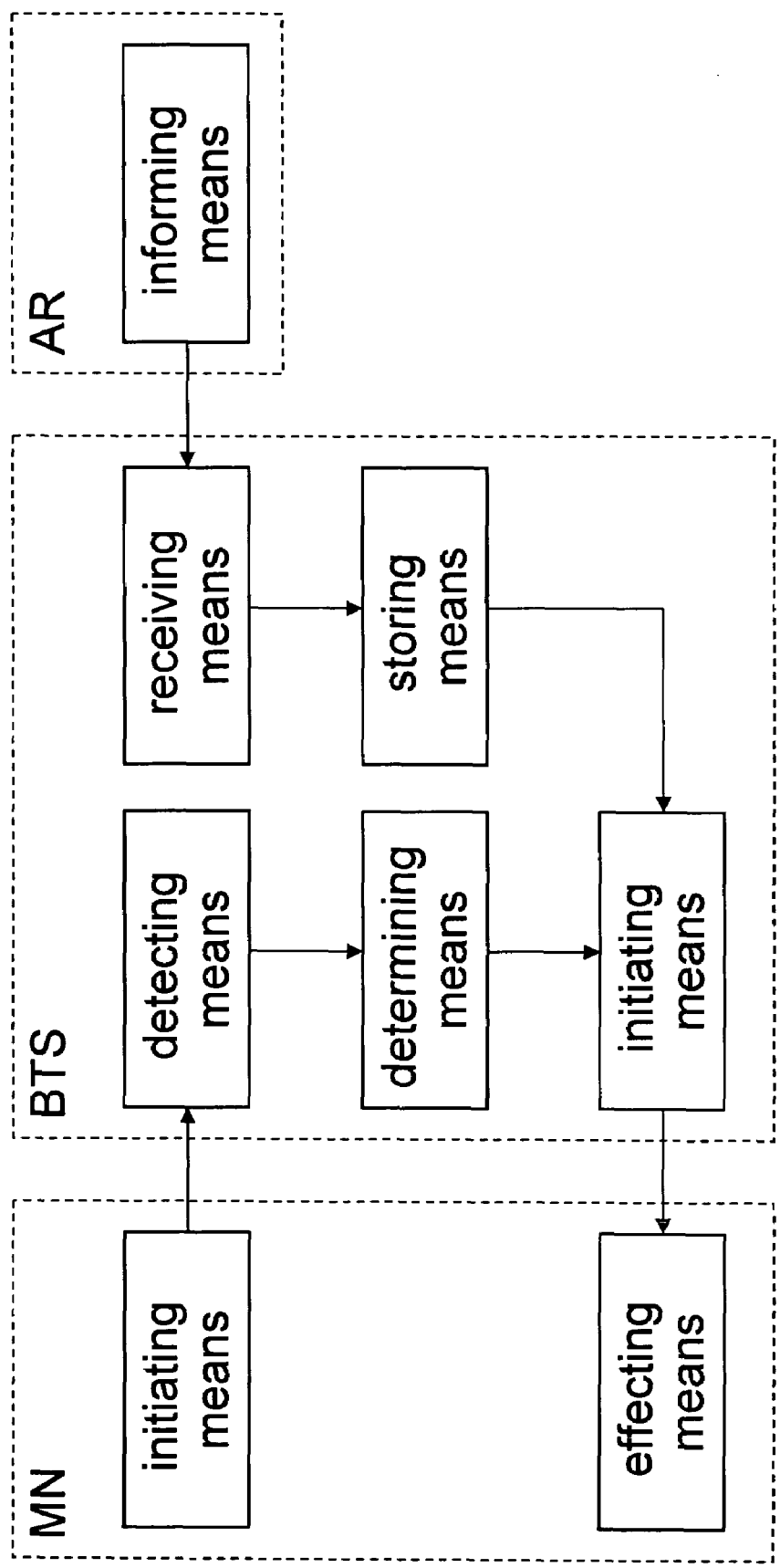
FIG. 3 depicts a block diagram of network elements and a terminal according to the first embodiment.

FIG. 3 depicts a block diagram of a base transceiver station BTS, an access router AR, and a terminal MN according to the first embodiment of the present invention. Thereby, the base transceiver station and the access router constitute the network infrastructure of this embodiment.

In the present embodiment, the terminal (e.g. a mobile node) comprises initiating means which is configured for initiating a terminal-related event of a lower protocol layer at the base transceiver station. As an example, the lower layer event is a sending of a link association request message on a data link layer to the base transceiver station. As mentioned above, such a link association request message can be comprised of one or more of the following parameters of the terminal: Interface_ID, Link_Local_Address, Current_IP_Address, Network_Id, Routing_Area_Id, and Router_Solicitation_Flag. Accordingly, one or more of these parameters can be used by the network infrastructure to determine a necessity for a higher layer event to be triggered. Moreover, the terminal comprises effecting means which is configured for rendering effective network-related events of a higher protocol layer, which event is initiated by the network infrastructure as described below. As an example, the higher layer event is a receiving of a router advertisement message from the network infrastructure, in particular from the base transceiver station.

Further, the present base transceiver station or base station comprises detecting means being configured for detecting the lower layer event from the terminal MN. Connected to the detecting means, there is provided determining means being configured for determining a necessity for a higher layer event on the basis of the detected lower layer event or at least one of the parameters included therein, and connected thereto, initiating means being configured for initiating, on behalf of the second network element, a higher layer event to be rendered effective at the terminal.

An informing means of the access router AR is configured for sending current information on a higher layer event to the first network element prior to the first network element detecting a lower layer event, and a receiving means is configured for receiving these information. These information are then stored in a storing means being accordingly configured.

The initiation only takes place, if the determining means yields a necessity for the higher layer event to be triggered, and is based on the information stored in the storing means.

Second Embodiment

Figure 4:
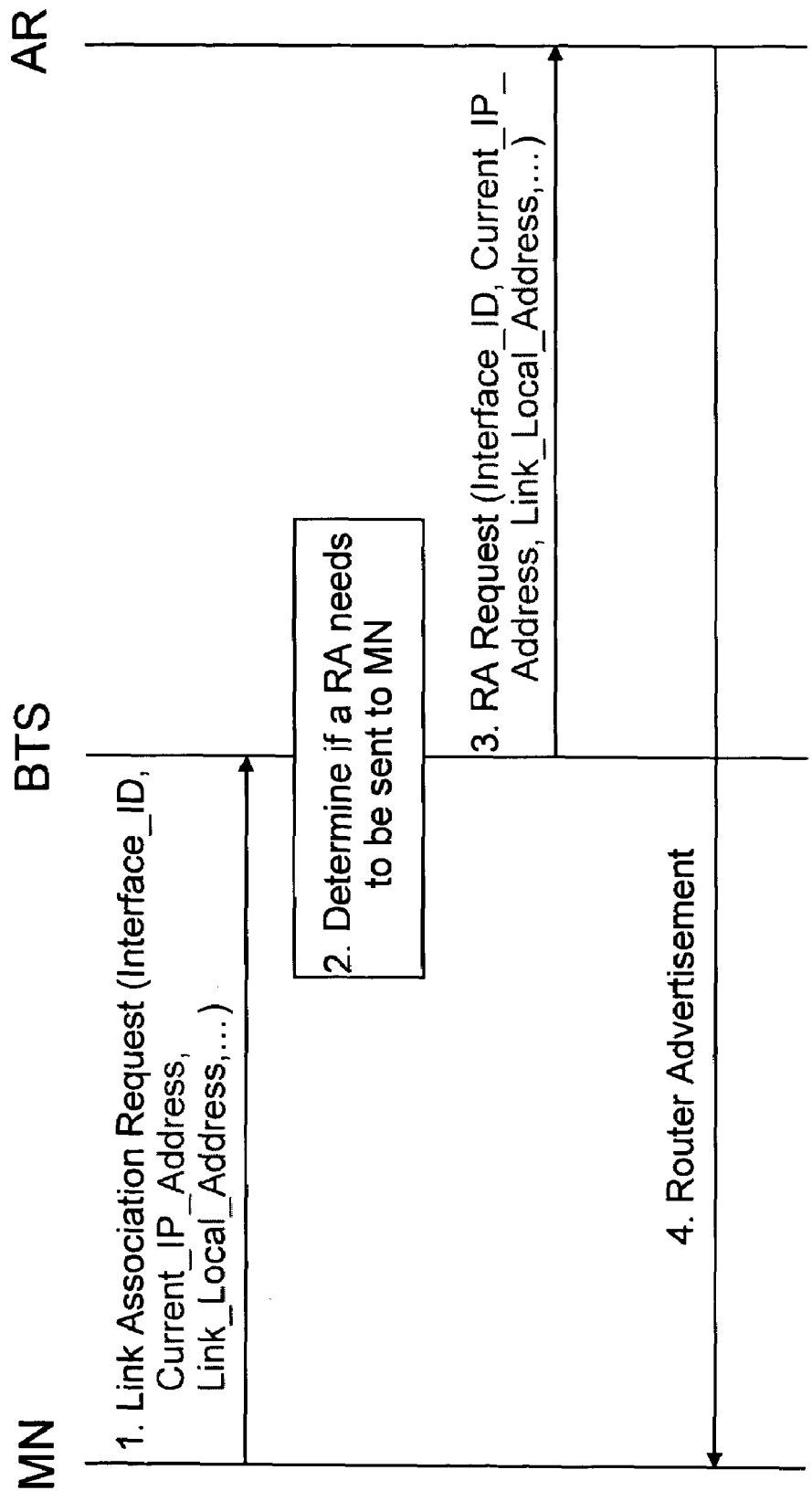
FIG. 4 depicts a signaling flow chart according to a second embodiment of the present invention.

FIG. 4 depicts a signaling flow chart according to a second embodiment of the present invention. Thereby, in the implementation according to FIG. 4, the base transceiver station has intelligence to determine the need for a higher layer event or message based on a lower layer event or message.

This embodiment is somehow similar to the implementation examples presented above. The difference resides in that the base transceiver station BTS requests the access router AR to send a Router Advertisement instead of sending it on behalf of the access router AR. Thus, no storing of respective information on the higher layer event or message and no storing means are needed at the base transceiver station BTS.

In step 1 of FIG. 4, the mobile node sends a link layer message for requesting a link establishment to first network element, i.e. to the base transceiver station. Upon receiving the respective Link Association Request message, the base transceiver station BTS first determines if a Router Advertisement needs to be sent to the mobile node right away.

In the case of FIG. 4, the base transceiver station can detect whether, for example, the old base transceiver station from where the mobile node just hands over is covered by a different access router (e.g., through the handover indication message sent from the old base transceiver station to the new base transceiver station). Then, the base transceiver station BTS determines whether or not to send a RA Request message to the competent access router AR (step 2). If no, the base transceiver station performs the usual link layer procedure. However, if yes, the base transceiver station in step 3 sends a RA Request message to the access router AR. The RA Request message contains but is not limited to the following parameters:

Interface_ID of the mobile node (optional): This is copied from the Interface_ID carried in the Link Association Request message.

Link_Local_Address of the mobile node (optional): This is also copied from the Interface_ID carried in the Link Association Request message.

It is to be noted that either the Interface_ID parameter or the Link_Local_Address parameter needs to be present in the message, so that the access router is able to process the request.

In this case where the base transceiver station BTS can determine whether or not a RA message needs to be sent based on a link layer message or event, then every RA Request message automatically triggers the access router AR to issue a unicast Router Advertisement to the mobile node.

In step 4 of FIG. 4, the access router AR sends the Router Advertisement directly to the mobile node MN in a unicast manner. The address of the mobile node MN is obtained from the Link_Local_Address parameter or derived from the Interface_ID parameter. Similar to the above second example, if multiple RA Request messages are generated for multiple mobile nodes, which indicates that multiple mobile nodes require a Router Advertisement message, the access router multicasts the Router Advertisement instead.

Stated in other words, in the method according to this embodiment, the step of determining is effected at the first network element and the step of initiating the higher layer event is effected at the second network element. The method further comprises a step of sending a request for the higher layer event from the first network element to the second network element in case the step of determining yields a necessity for the higher layer event to be triggered, the request being based on the detected lower layer event.

Figure 5:
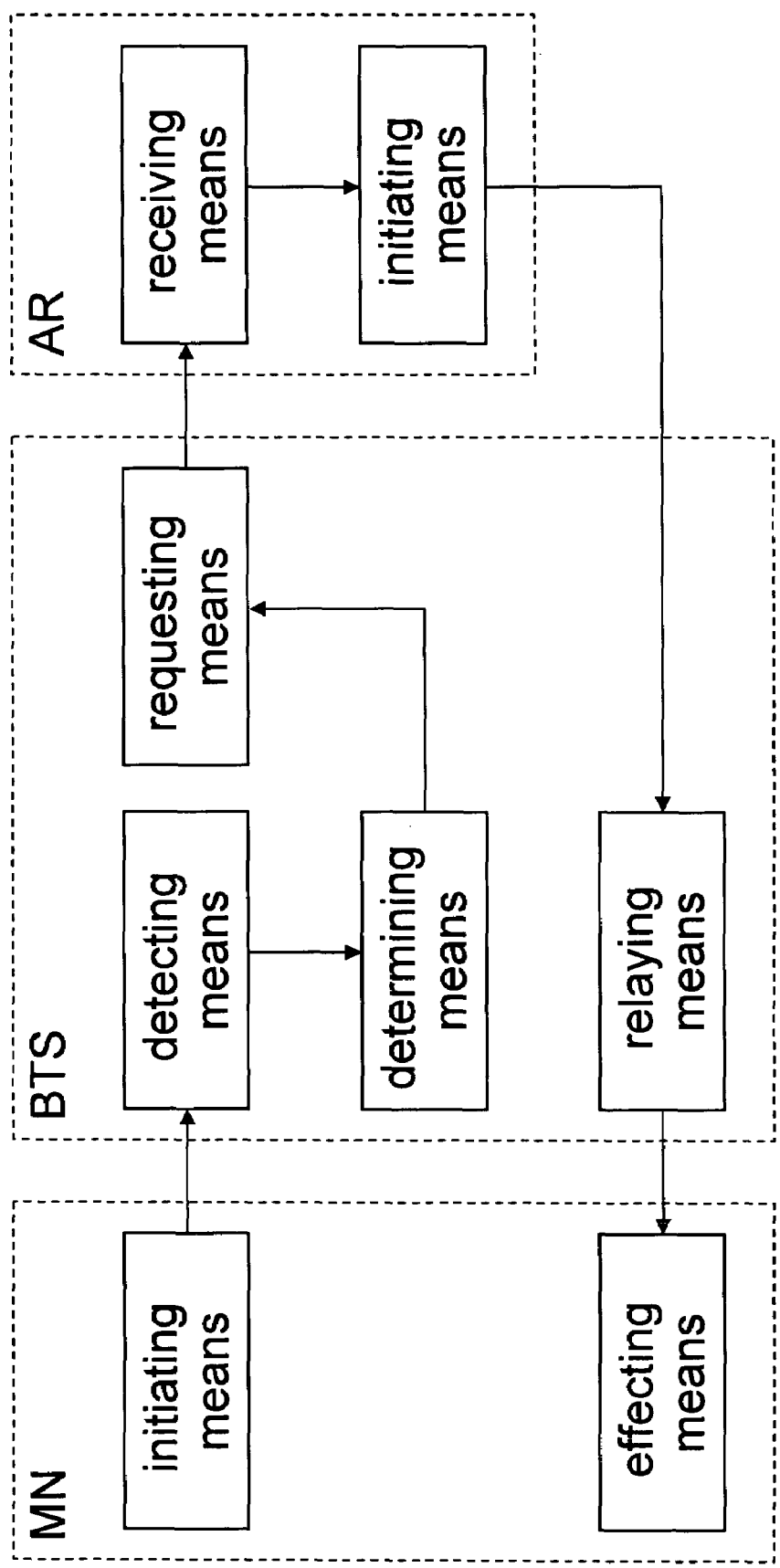
FIG. 5 depicts a block diagram of network elements and a terminal according to the second embodiment.

FIG. 5 depicts a block diagram of a base transceiver station BTS, an access router AR, and a terminal MN according to the second embodiment of the present invention. Thereby, the base transceiver station and the access router constitute the network infrastructure of this embodiment.

The terminal MN according to this embodiment is comparable to the one of the first embodiment, and will therefore not be described in detail here.

The base transceiver station or base station according to the present embodiment comprises a detecting means being configured for detecting the lower layer event as well as a determining means being configured for determining a necessity for a higher layer event on the basis of the detected lower layer event. A requesting means of the base transceiver station is configured for sending a request for the higher layer event to the second network element, if the determining means yields a necessity for the higher layer event to be triggered. The request is based on the detected lower layer event or at least one of the parameters included therein. It comprises at least one of the following parameters of the terminal: Interface_ID and Link_Local_Address.

The second network element, i.e. the access router according to FIG. 5, comprises receiving means being configured for receiving a request for a higher layer event from the first network element, the request being based on the detected lower layer event. Further, there is provided an initiating means being configured for initiating, based on the received request, the higher layer event to be rendered effective at the terminal.

For being rendered effective at the terminal, the initiated higher layer event is relayed from the access router AR to the terminal. For such relaying, there is further provided a relaying means at the base transceiver station.

Third Embodiment

Figure 6:
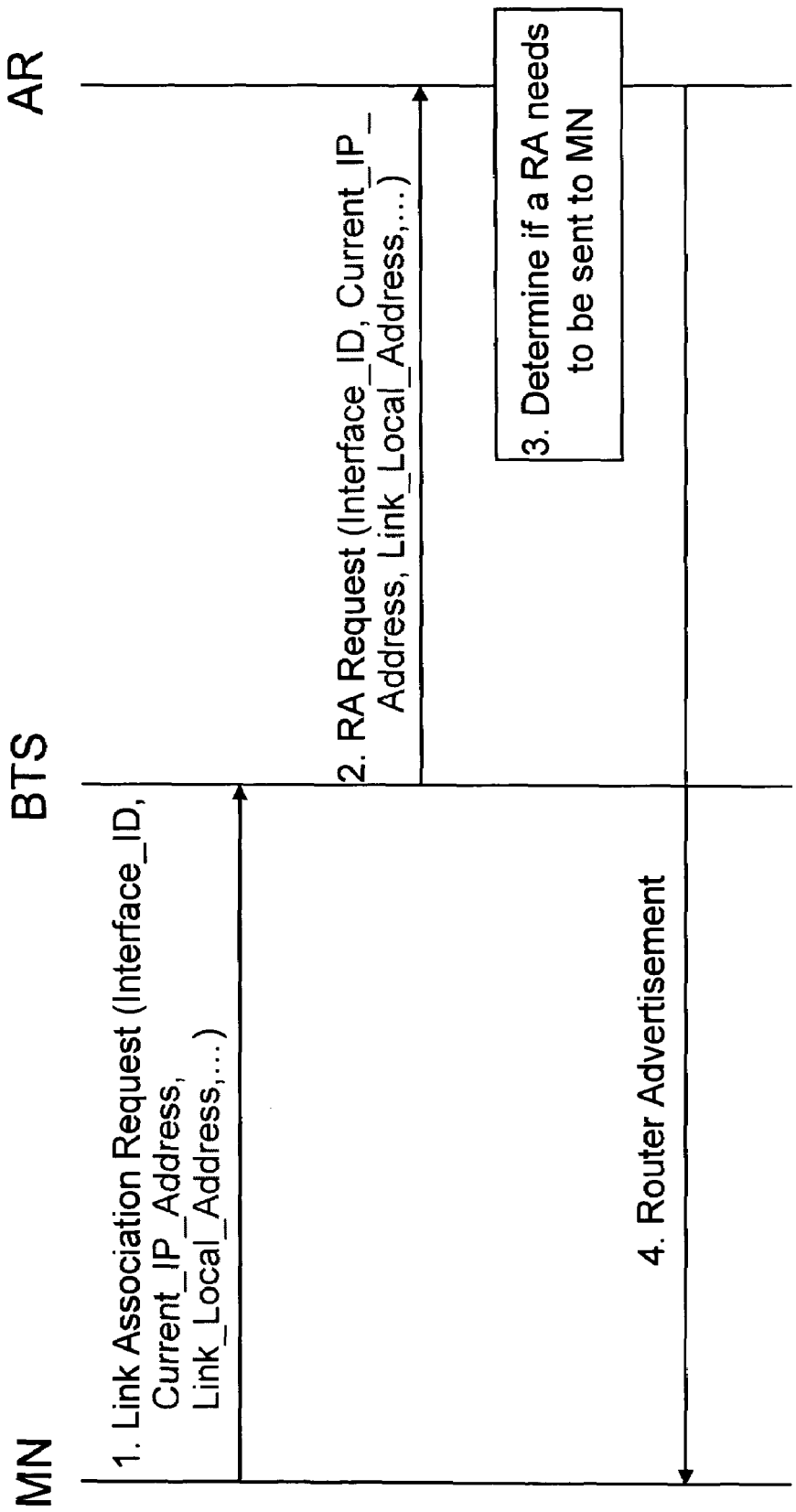
FIG. 6 depicts a signaling flow chart according to a third embodiment of the present invention.

FIG. 6 depicts a signaling flow chart according to a third embodiment of the present invention. Thereby, in the implementation according to FIG. 6, instead of in the base transceiver station, intelligence to determine the necessity for a higher layer event or message based on a lower layer event or message resides in the access router. That is, the base transceiver station is not able to decide on the necessity for a network layer event or message when detecting a lower layer event or message.

In this case, upon detection of a lower layer event such as upon reception of a Link Association Request message from the mobile node MN (step 1), the base transceiver station BTS in step 2 always sends a request for a higher layer event to the access router AR. In FIG. 6, this request is represented by the RA Request message. The access router AR determines in step 3 if a higher layer event/message such as a Router Advertisement needs to be sent/excited to/at the mobile node right away. Therefore, a corresponding determination at the base transceiver station is not needed here.

One or more of the following parameters can be used by the access router to determine if a Router Advertisement needs to be sent right away.

Current_IP_Address of the mobile node: This is copied from the Current_IP_Address in the Link Association Request message.

Network_Id: This is copied from the Network_Id in the Link Association Request message.

Routing_Area_Id: This is copied from Routing_Area_Id parameter in the Link Association Request message.

Router_Solicitation_Flag: This is copied from Router_Solicitation_Flag parameter in the Link Association Request message.

It is to be noted that these parameters are only required if the base transceiver station cannot detect if the mobile node handing over from an old BTS needs a new IP address.

In this case where the base transceiver station BTS cannot determine whether or not a RA message needs to be sent based on a link layer message or event, the access router AR makes the decision based either on the prefix of Current_IP_Address parameter, or the Network_Id parameter, and/or the Routing_Area_Id parameter, or the Router_Solicitation_Flag. If no Router Advertisement needs to be sent, the access router AR ignores the request.

Otherwise, the access router AR unicasts a Router Advertisement message directly to the mobile node MN (step 4). The address of the mobile node is obtained from the Link_Local_Address parameter or derived from the Interface_ID. Similar to the above, if multiple RA Request messages are generated for multiple mobile nodes, which indicates that multiple mobile nodes require a Router Advertisement, the access router AR multicasts the Router Advertisement instead.

Stated in other words, in the method according to this embodiment, the steps of determining and initiating the higher layer event are both effected at the second network element, i.e. the access router. The method further comprises a step of sending a request for the higher layer event from the first network element to the second network element, the request being based on the detected lower layer event or message.

Figure 7:
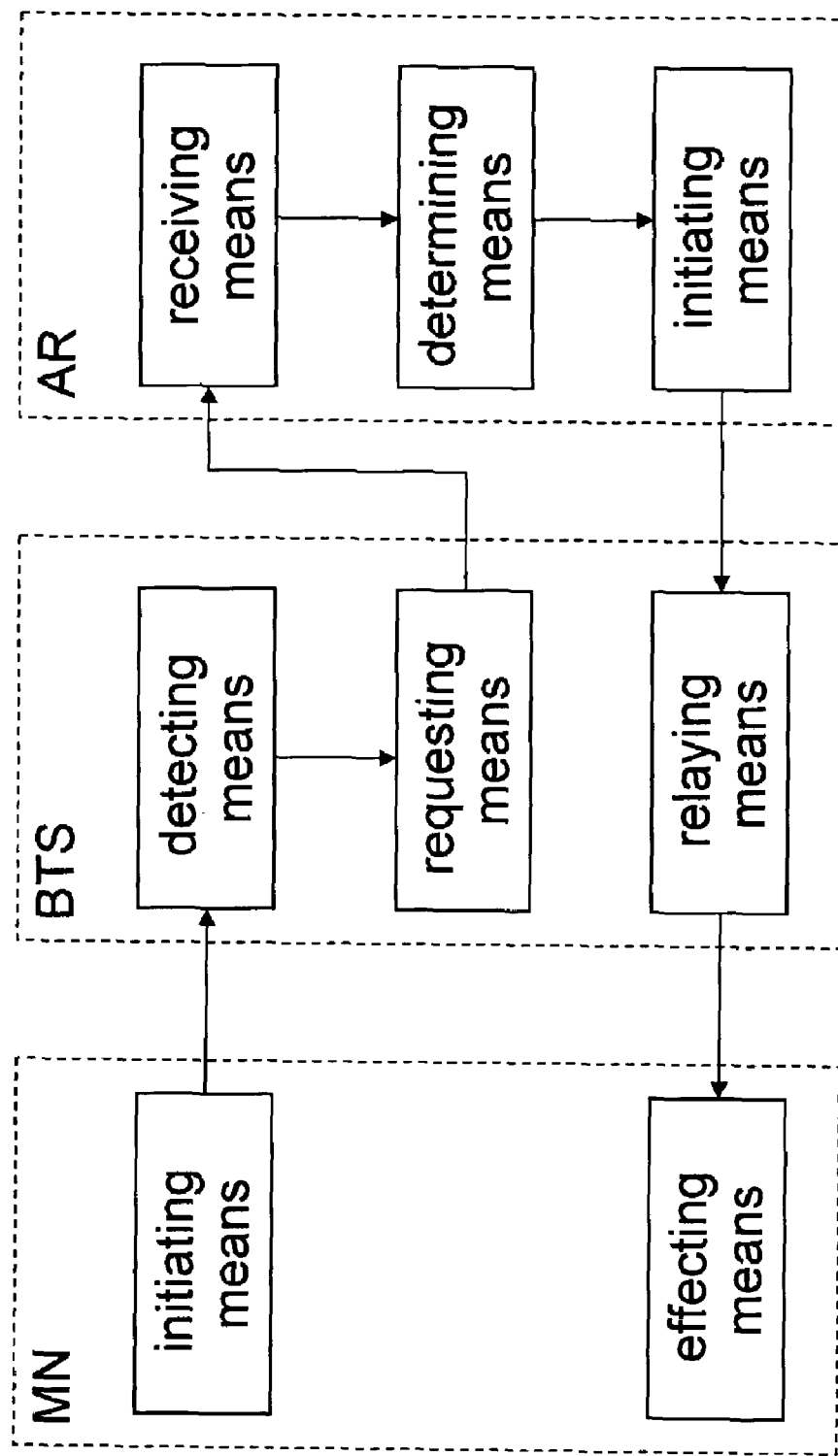
FIG. 7 depicts a block diagram of network elements and a terminal according to the third embodiment.

FIG. 7 depicts a block diagram of a base transceiver station BTS, an access router AR, and a terminal MN according to the third embodiment of the present invention. Thereby, the base transceiver station and the access router constitute the network infrastructure of this embodiment.

The terminal MN according to this embodiment is likewise comparable to the one of the first embodiment, and will therefore not be described in detail here.

The base transceiver station or base station of FIG. 7 comprises detecting means being configured for detecting a higher layer event and requesting means being configured for sending a request for the higher layer event to the second network element, the request being based on the detected lower layer event or at least one of the parameters included therein. It comprises at least one of the following parameters of the terminal: Interface_ID and Link_Local_Address.

According to FIG. 7, the second network element being represented by the access router AR comprises receiving means being configured for receiving the request from the first network element, determining means being configured for determining a necessity for a higher layer event on the basis of the detected lower layer event, and initiating means being configured for initiating the higher layer event to be rendered effective at the terminal. The initiation of the higher layer event only takes place, if the determining means yields a necessity for the higher layer event to be triggered, and is based on the received request, i.e. the detected lower layer event.

For being rendered effective at the terminal, the initiated higher layer event is relayed from the access router AR to the terminal. For such relaying, there is further provided a relaying means at the base transceiver station.

Taking into consideration the implementation examples of the above embodiments, it is apparent that an intelligence or capability for determining the need for a higher layer event or message to be triggered right away is required either in the base transceiver station or in the access router, i.e. in either one of the network elements building up the network infrastructure.

Furthermore, it is to be noted that the above-mentioned RA request message on the BTS-AR link can be a standalone IP message like Router Solicitation, or a standalone link layer (L2) message, or can be embedded into existing BTS-AR signaling.

With regard to any of the above embodiments, at least one of the network elements involved in the method according to the present invention may additionally comprise designating means. The designating means is configured for designating whether the higher layer event, if at all, is to be triggered for one terminal or for a plurality of terminals at a time, as it is already described above.

It is to be noted that the mentioned functional steps of the described method and the functional elements of the described arrangements as well as their constituents can be implemented by any known means, either in hardware and/or software, respectively, if they are only adapted to perform the respective effects and/or functions described above. For example, the determining means of the base station or the access router can be implemented by any analogue or digital data processing unit, e.g. a microprocessor, a digital signal processor (DSP), or an application-specific integrated circuit (ASIC), which is adapted to determine a necessity for triggering a higher layer event on the basis of a lower layer event. In this case of a hardware implementation, the specific technology used is irrelevant to the present invention, such as e.g. MOS or bipolar transistors. In case of a software implementation, the implementation is independent from the specific programming language or environment used, such as e.g. C++, Assembler.

The mentioned parts and functions can also be realized in separately or individually functional blocks, or one or more of the mentioned parts and functions can be realized in common or jointly.

In summary, the present invention exemplarily provides for an alternative approach to trigger the network to send an IP level control signaling or message (e.g., Router Advertisement). In this example case, the triggering is performed by a link level event or message instead of an IP level event or message. In preferred embodiments of the present invention, link level events or messages on the MN-BTS link are utilized for this purpose. Various link level events can act as a trigger.

According to the present invention, there is provided a method, network elements, a terminal, and a system of triggering events in a protocol layer stack of a communication system comprising at least one terminal and a network infrastructure including at least a first network element and a second network element, the method comprising the steps of detecting a terminal-related event of a lower protocol layer at the first network element; initiating a network-related event of a higher protocol layer to be rendered effective at the terminal, wherein the step of initiating further comprises a step of determining a necessity for the higher layer event on the basis of the detected lower layer event, and the step of initiating is effected in case the step of determining yields a necessity for the higher layer event to be triggered.

Even though the invention is described above with reference to the examples according to the accompanying drawings, it is clear that the invention is not restricted thereto. Rather, it is apparent to those skilled in the art that the present invention can be modified in many ways without departing from the scope of the inventive idea as disclosed in the appended claims.

The invention claimed is:

1. A method, comprising:
   detecting, by a detector, a terminal-related event of a lower protocol layer of a protocol layer stack, a lower layer event, at a first network element;
   initiating, by an initiating unit, a network-related event of a higher protocol layer of the protocol layer stack, a higher layer event, to be rendered effective at a terminal, wherein
   the initiating further comprises determining, by a determiner, a necessity for the higher layer event on a basis of the detected lower layer event, and
   the initiating is effected in case the determining yields a necessity for the higher layer event to be triggered.

2. The method according to claim 1, wherein the determining is effected at the first network element.

3. The method according to claim 2, wherein the initiating the higher layer event is effected at the first network element on behalf of a second network element.

4. The method according to claim 3, further comprising:
sending current information on the higher layer event from the second network element to the first network element; and
storing the sent current information at the first network element, wherein
the sending and storing are effected prior to the detecting the lower layer event, and
the initiating the higher layer event is based on the stored current information.

5. The method according to claim 2, wherein the initiating the higher layer event is effected at the second network element.

6. The method according to claim 5, further comprising:
sending a request for the higher layer event from the first network element to the second network element in case the determining yields the necessity for the higher layer event to be triggered, the request being based on the detected lower layer event.

7. The method according to claim 6, wherein the request comprises at least one of an interface identity parameter of the terminal and a link local address parameter of the terminal.

8. The method according to claim 1, wherein the determining and initiating the higher layer event are effected at the second network element.

9. The method according to claim 8, further comprising:
sending a request for the higher layer event from the first network element to the second network element, the request being based on the detected lower layer event.

10. The method according to claim 9, wherein the request comprises at least one of an interface identity parameter of the terminal and a link local address parameter of the terminal.

11. The method according to claim 1, wherein the determining further comprises designating whether the higher layer event is to be triggered for one terminal or for a plurality of terminals at a time.

12. The method according to claim 1, wherein the protocol layer stack comprises a protocol stack of a packet-based transmission protocol and the method is performed in the protocol stack of the packet-based transmission protocol.

13. The method according to claim 1, wherein the lower protocol layer comprises a data link layer and the detecting the terminal-related event comprises detecting the terminal-related event of the data link layer.

14. The method according to claim 1, wherein the higher protocol layer comprises a network layer and the initiating the network-related event comprises initiating the network-related event of the network layer.

15. The method according to claim 1, wherein the lower layer event comprises a link association request message and the detecting the terminal-related event comprises detecting the link association request message.

16. The method according to claim 15, wherein the link association request message comprises at least one of an interface identity parameter of the terminal, a link local address of the terminal, a current IP address parameter of the terminal and network identity parameter of the terminal and a routing area identity parameter of the terminal and a router solicitation flag parameter of the terminal.

17. The method according to claim 1, wherein the higher layer event comprises a router advertisement message and the initiating the network-related event comprises initiating the router advertisement message.

18. An apparatus, comprising:
a detector configured to detect a terminal-related event of a lower protocol layer of a protocol layer stack, a lower layer event;
a determiner configured to determine a necessity for a network-related event of a higher protocol layer of the protocol layer stack, a higher layer event, on the basis of the detected lower layer event;
an initiating unit configured to initiate, on behalf of a network element, the higher layer event to be rendered effective at a terminal, if the determiner yields a necessity for the higher layer event to be triggered;
a receiver configured to receive current information on the higher layer event from the network element; and
wherein the initiating unit is configured to initiate the higher layer event based on the stored information.

19. The apparatus according to claim 18, wherein the apparatus comprises a base transceiver station.

20. The apparatus according to claim 18, further comprising a designating unit configured to designate whether the higher layer event is to be triggered for one terminal or for a plurality of terminals at a time.

21. An apparatus, comprising:
a detector configured to detect a terminal-related event of a lower protocol layer of a protocol layer stack, a lower layer event;
a determiner configured to determine a necessity for a network-related event of a higher protocol layer of the protocol layer stack, a higher layer event, on the basis of the detected lower layer event;
a requesting unit configured to send a request for the higher layer event to a network element, if the determiner yields a necessity for the higher layer event to be triggered, the request being based on the detected lower layer event; and
a relaying unit configured to relay the higher layer event being initiated at the network element to a terminal.

22. The apparatus according to claim 21, wherein the apparatus comprises a base transceiver station.

23. An apparatus, comprising:
a detector configured to detect a terminal-related event of a lower protocol layer of a protocol layer stack, a lower layer event;
a requesting unit configured to send a request for a higher layer event to a network element, the request being based on the detected lower layer event of the protocol layer stack; and
a relaying unit configured to relay the higher layer event being initiated at the network element to a terminal.

24. The apparatus according to claim 23, wherein the apparatus comprises a base transceiver station.

25. An apparatus, comprising:
an informing unit configured to inform current information on a network-related event of a higher protocol layer of a protocol layer stack, a higher layer event, to a first network element prior to the first network element detecting a terminal-related event of a lower protocol layer of the protocol layer stack, a lower layer event.

26. The apparatus according to claim 25, wherein the apparatus comprises an access router.

27. An apparatus, comprising:
a receiver configured to receive a request for a network-related event of a higher protocol layer of a protocol layer stack, a higher layer event, from a first network element, the request being based on a detected terminal-related event of a lower protocol layer of the protocol layer stack, a lower layer event; and
an initiating unit configured to initiate, based on the received request, the higher layer event to be rendered effective at a terminal.

28. The apparatus according to claim 27, further comprising a designating unit configured to designate whether the higher layer event is to be triggered for one terminal or for a plurality of terminals at a time.

29. The apparatus according to claim 27, wherein the apparatus comprises an access router.

30. An apparatus, comprising:
a receiver configured to receive a request for a network-related event of a higher protocol layer of a protocol layer stack, a higher layer event, from a first network element, the request being based on a detected terminal-related event of a lower protocol layer of the protocol layer stack, a lower layer event;
a determiner configured to determine a necessity for the higher layer event on the basis of the detected lower layer event; and
an initiating unit configured to initiate, based on the received request, the higher layer event to be rendered effective at a terminal, if the determiner yields a necessity for the higher layer event to be triggered.

31. The apparatus according to claim 30, further comprising a designating unit configured to designate whether the higher layer event is to be triggered for one terminal or for a plurality of terminals at a time.

32. The apparatus according to claim 30, wherein the apparatus comprises an access router.

33. A system, comprising:
at least one first network element comprising:
a detector configured to detect a terminal-related event of a lower protocol layer of a protocol layer stack, a lower layer event;
a determiner configured to determine a necessity for a network-related event of a higher protocol layer of the protocol layer stack, a higher layer event, on the basis of the detected lower layer event;
an initiating unit configured to initiate the higher layer event to be rendered effective at a terminal, if the determiner yields a necessity for the higher layer event to be triggered;
a receiver configured to receive current information on the higher layer event from at least one second network element; and
wherein the initiating unit is configured to initiate the higher layer event based on stored information, and
wherein the at least one second network element comprises an informing unit configured to send the current information on the higher layer event to the at least one first network element prior to the at least one first network element detecting the lower layer event.

34. A system, comprising:
at least one first network element comprising a detector configured to detect a terminal-related event of a lower protocol layer of a protocol layer stack, a lower layer event;
a determiner configured to determine a necessity for a network-related event of a higher protocol layer of the protocol layer stack, a higher layer event, on the basis of the detected lower layer event;
a requesting unit configured to send a request for the higher layer event, if the determiner yields a necessity for the higher layer event to be triggered, the request being based on the detected lower layer event; and
a relaying unit configured to relay the higher layer event being initiated to a terminal, and
at least one second network element comprising a receiver configured to receive the request for the higher layer event from the at least one first network element, the request being based on the detected lower layer event; and
an initiating unit configured to initiate, based on the received request, the higher layer event to be rendered effective at the terminal.

35. A system, comprising:
at least one first network element comprising a detector configured to detect a terminal-related event of a lower protocol layer of a protocol layer stack, a lower layer event;
a requesting unit configured to request a request for a higher layer event, the request being based on the detected lower layer event; and
a relaying unit configured to relay the higher layer event being initiated at the second network element to a terminal, and
at least one second network element comprising a receiver configured to receive the request for the higher layer event from the at least one first network element, the request being based on the detected lower layer event;
a determiner configured to determine a necessity for the higher layer event on the basis of the detected lower layer event; and
an initiating unit configured to initiate, based on the received request, the higher layer event to be rendered effective at the terminal, if the determiner yields a necessity for the higher layer event to be triggered.

36. An apparatus, comprising:
an initiator configured to initiate a terminal-related event of a lower protocol layer of a protocol layer stack, a lower layer event, at a first network element; and
a processor configured to render effective a network-related event of a higher protocol layer of the protocol layer stack, a higher layer event, being initiated at a network infrastructure.

37. The apparatus according to claim 36, wherein the lower layer event is a sending of a link association request message to a first network element 38. The apparatus according to claim 37, wherein the link association request message comprises at least one of an interface identity parameter of the apparatus, a link local address of the apparatus, a current IP address parameter of the apparatus and network identity parameter of the apparatus and a routing area identity parameter of the apparatus and a router solicitation flag parameter of the apparatus.

39. The apparatus according to claim 36, wherein the higher layer event is a receipt of a router advertisement message from the network infrastructure.

* * * * *

UNITED STATES PATENT AND TRADEMARK OFFICE
CERTIFICATE OF CORRECTION

| | | |
|---|---|---|
| PATENT NO. | : 7,599,345 B2 | Page 1 of 1 |
| APPLICATION NO. | : 11/008971 | |
| DATED | : October 6, 2009 | |
| INVENTOR(S) | : Zheng et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 957 days.

Signed and Sealed this

Twenty-eighth Day of September, 2010

David J. Kappos
*Director of the United States Patent and Trademark Office*